(12) United States Patent
Hariyama et al.

(10) Patent No.: US 12,510,668 B2
(45) Date of Patent: Dec. 30, 2025

(54) DISTANCE MEASUREMENT SYSTEM AND DISTANCE MEASUREMENT METHOD

(71) Applicant: Hitachi, Ltd., Tokyo (JP)

(72) Inventors: Tatsuo Hariyama, Tokyo (JP); Masahiro Watanabe, Tokyo (JP); Atsushi Taniguchi, Tokyo (JP); Kenji Maruno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 17/597,479

(22) PCT Filed: Jun. 11, 2020

(86) PCT No.: PCT/JP2020/023001
§ 371 (c)(1),
(2) Date: Jan. 7, 2022

(87) PCT Pub. No.: WO2021/024614
PCT Pub. Date: Feb. 11, 2021

(65) Prior Publication Data
US 2022/0268929 A1 Aug. 25, 2022

(30) Foreign Application Priority Data
Aug. 8, 2019 (JP) .................... 2019-145889

(51) Int. Cl.
*G01S 17/08* (2006.01)
*G01B 9/02017* (2022.01)

(52) U.S. Cl.
CPC .......... *G01S 17/08* (2013.01); *G01B 9/02017* (2013.01)

(58) Field of Classification Search
CPC .......... G01S 17/08; G01S 17/34; G01S 7/497; G01S 7/4812; G01S 7/4816;
(Continued)

(56) References Cited

U.S. PATENT DOCUMENTS

| 5,657,405 A | 8/1997 | Fujiwara |
| 10,527,784 B1 * | 1/2020 | Koste .................... G02B 6/124 |

(Continued)

FOREIGN PATENT DOCUMENTS

| DE | 10028068 A1 * | 10/2001 | ......... B29C 37/0092 |
| JP | 9-5028 A | 1/1997 | |

(Continued)

OTHER PUBLICATIONS

International Search Report (PCT/ISA/210) issued in PCT Application No. PCT/JP2020/023001 dated Sep. 1, 2020 with English translation (five (5) pages).

(Continued)

*Primary Examiner* — Jennifer D. Carruth
(74) *Attorney, Agent, or Firm* — Crowell & Moring LLP

(57) ABSTRACT

According to the present invention, a measured distance is corrected in accordance with change in the surrounding environment. A distance measurement system includes: a first light-receiving unit configured to irradiate an object with one part of a split light beam as assessment light, and receive light reflected by the object to detect a target assessment beat signal; a second light-receiving unit configured to guide the other part of the split light beam as reference light to a reference optical path serving as a distance reference, and receive the reference light that has passed through the reference optical path to detect a reference optical path assessment beat signal; a distance measurement unit configured to measure a distance to the object on the basis of the target assessment beat signal and the reference optical path assessment beat signal; a temperature sensor configured to assess a temperature in the periphery of the reference optical path; and a correction unit configured to correct the measured distance on the basis of the assessed temperature.

10 Claims, 8 Drawing Sheets

(58) Field of Classification Search
CPC ..... G01S 7/52006; G01C 3/06; G01B 11/007; G01B 11/026; G01B 9/02017; G01B 21/042; G01B 5/0011; G01K 5/00; G01L 1/2281; G21B 7/00; G02B 7/008; G02B 6/44–4457
See application file for complete search history.

(56) References Cited

U.S. PATENT DOCUMENTS

| | | | |
|---|---|---|---|
| 2003/0142938 A1* | 7/2003 | Koyano | G02B 6/4457 385/123 |
| 2006/0182383 A1* | 8/2006 | Slotwinski | G01S 17/34 385/11 |
| 2013/0259088 A1* | 10/2013 | Bellis | F01D 17/085 374/138 |
| 2014/0125986 A1 | 5/2014 | Johnson et al. | |
| 2015/0022826 A1* | 1/2015 | Cramer | G01B 11/14 356/620 |
| 2016/0302010 A1* | 10/2016 | Sebastian | G01S 17/58 |

FOREIGN PATENT DOCUMENTS

| | | | |
|---|---|---|---|
| JP | 2003083816 A | * | 3/2003 |
| JP | 2005-049255 A | | 2/2005 |
| JP | 2008304314 A | * | 12/2008 |
| JP | 2016-502428 A | | 1/2016 |
| JP | 2018048914 A | * | 3/2018 |
| WO | WO-2014084139 A1 | * | 6/2014 ............. A61B 3/102 |
| WO | WO-2017081808 A1 | * | 5/2017 |

OTHER PUBLICATIONS

Japanese-language Written Opinion (PCT/ISA/237) issued in PCT Application No. PCT/JP2020/023001 dated Sep. 1, 2020 (five (5) pages).

* cited by examiner

[FIG. 1]
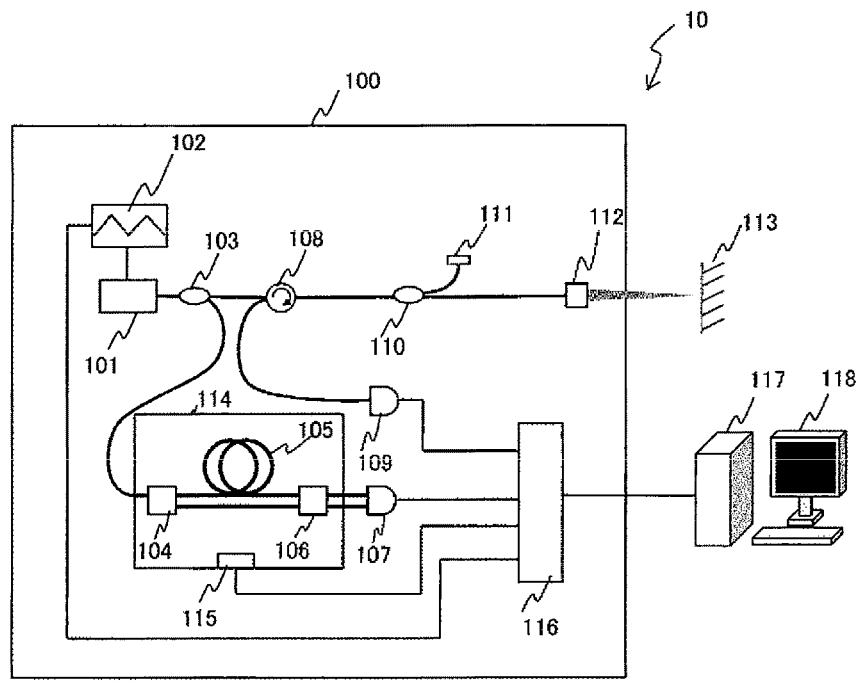
[FIG. 2]
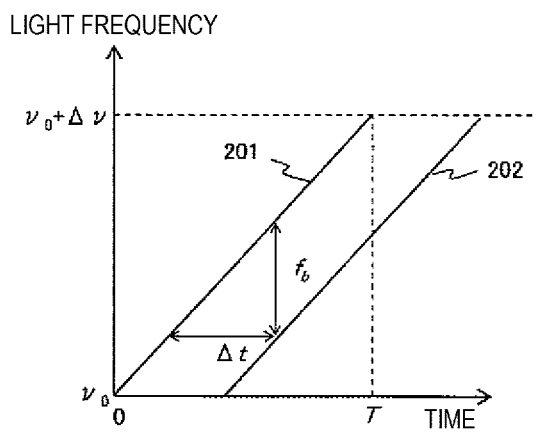
[FIG. 3]
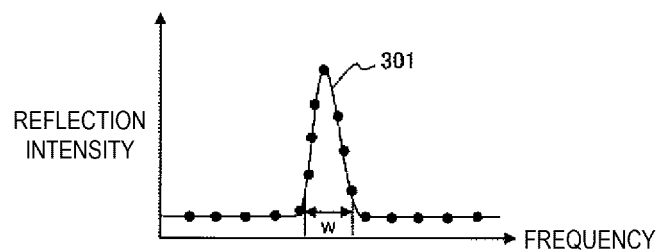

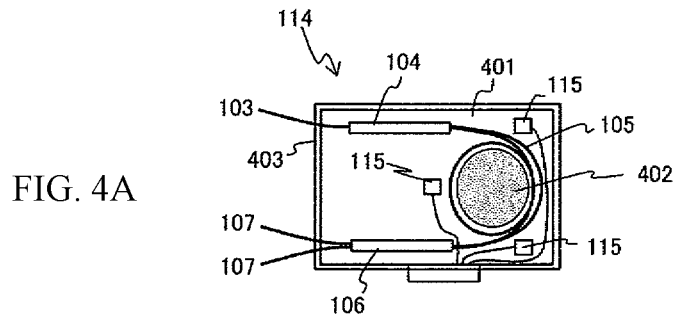
FIG. 4A
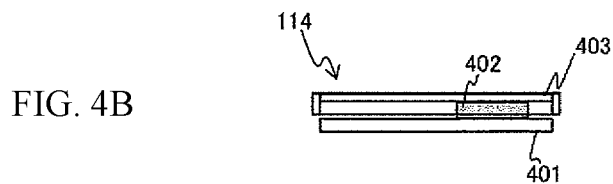
FIG. 4B
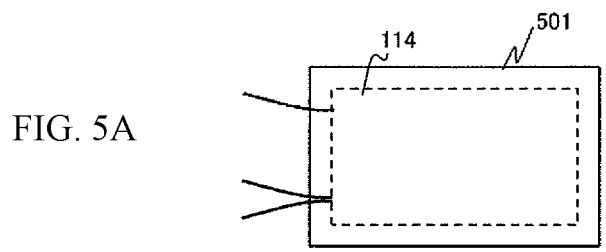
FIG. 5A
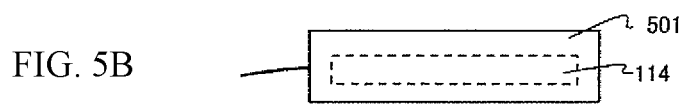
FIG. 5B
[FIG. 6]
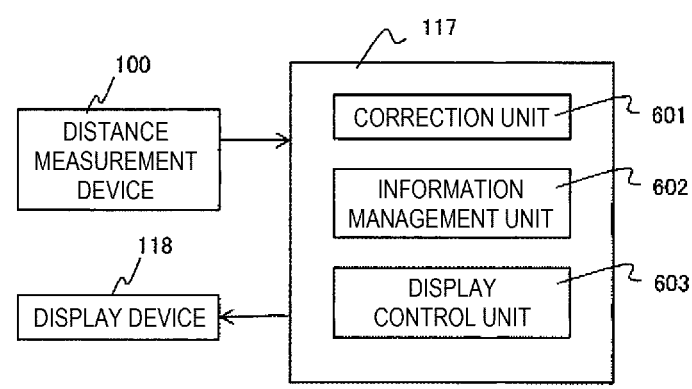

[FIG. 7]
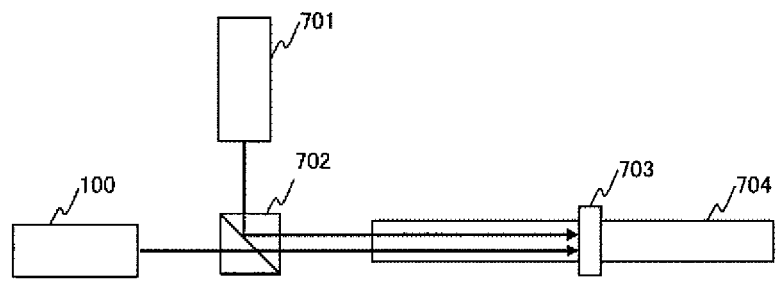
[FIG. 8]
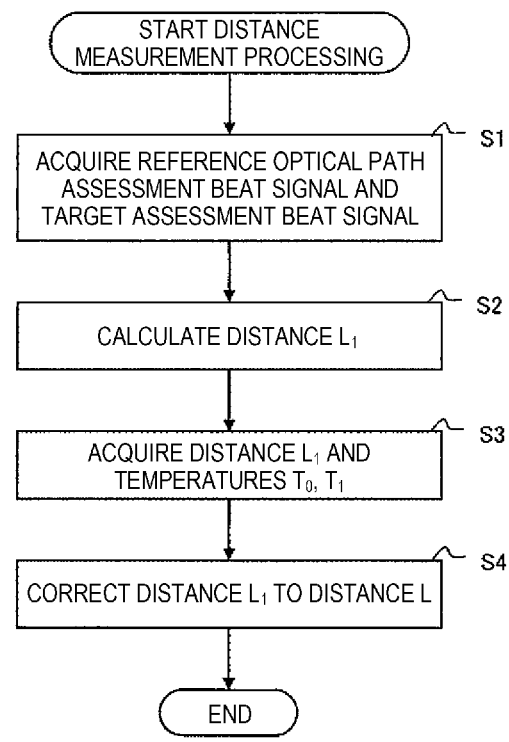

[FIG. 9]
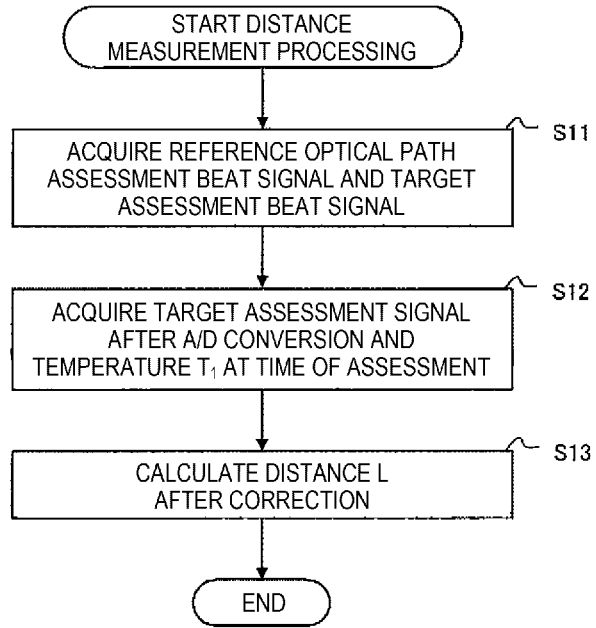
[FIG. 10]
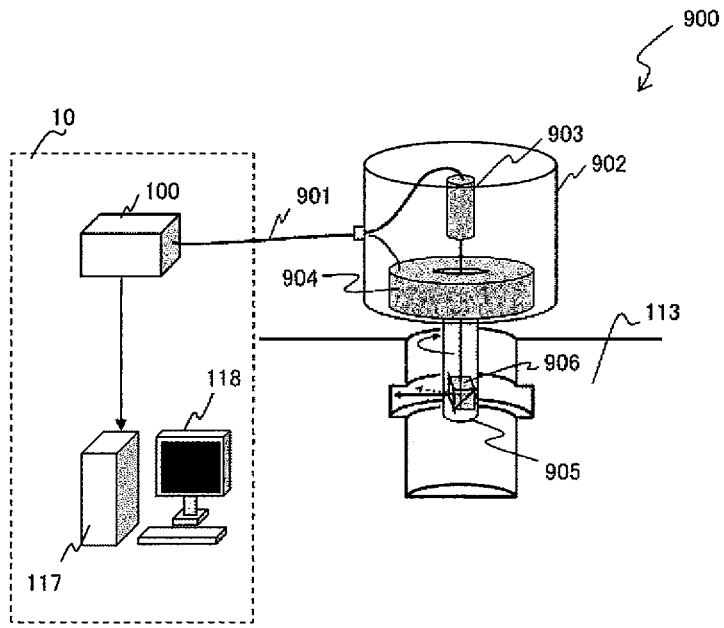

[FIG. 11]
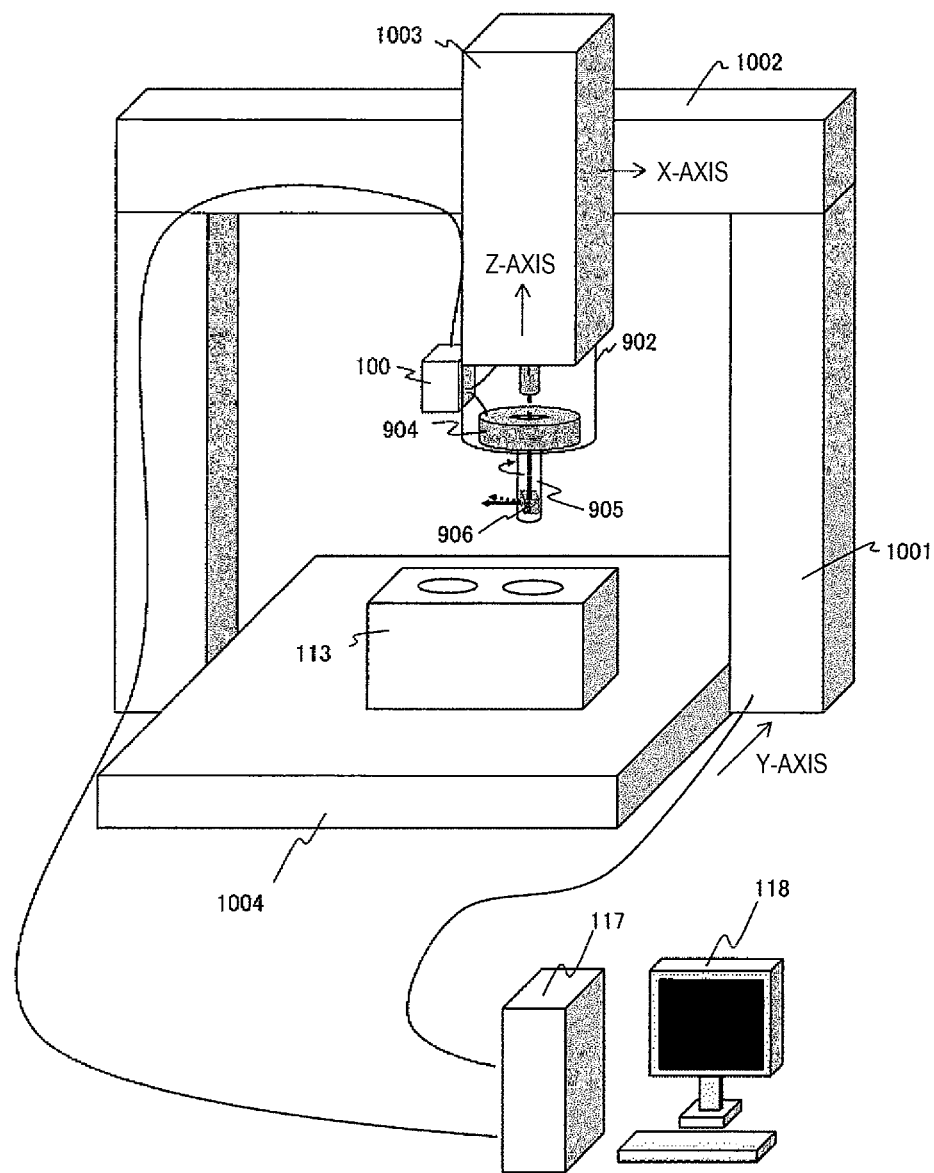

[FIG. 12]
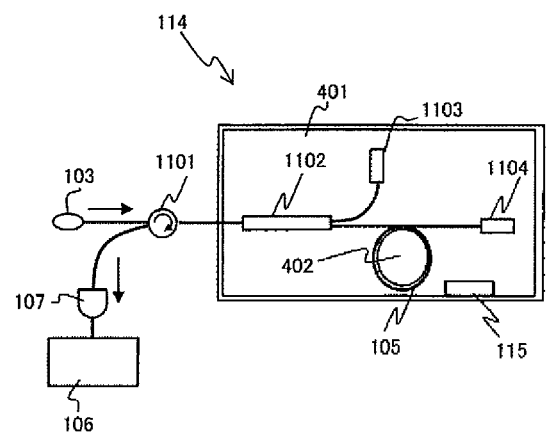
[FIG. 13]
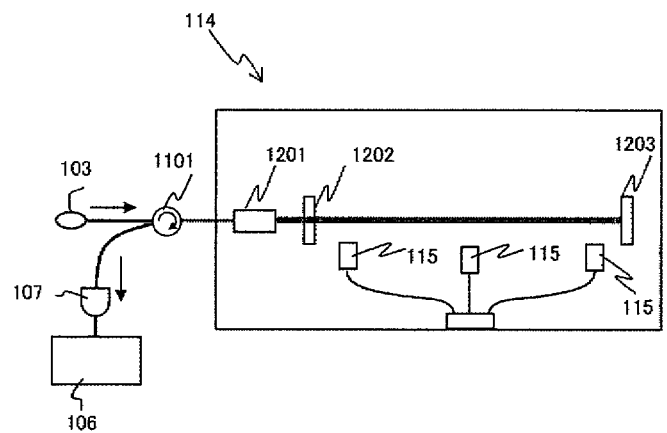

[FIG. 14]
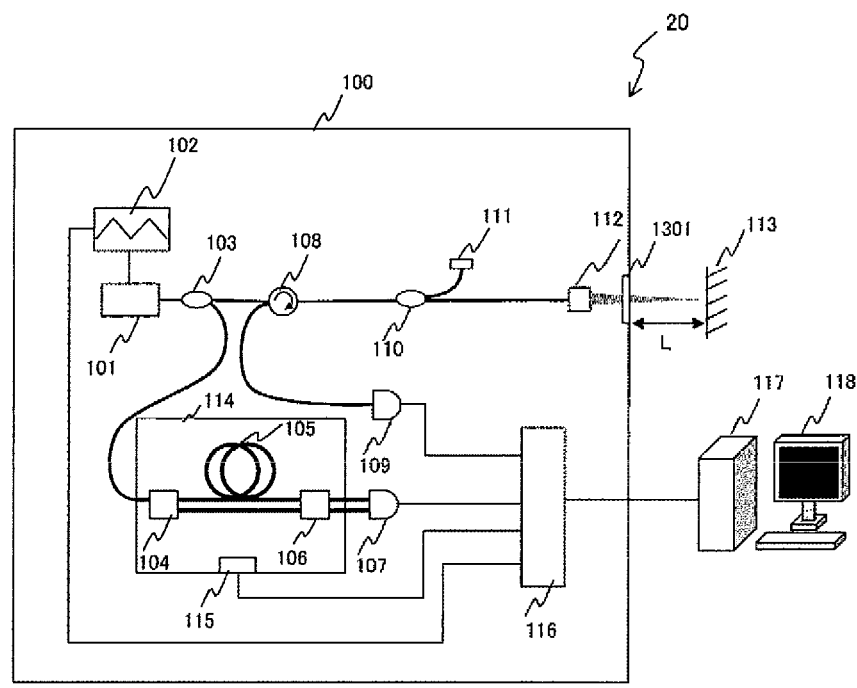
[FIG. 15]
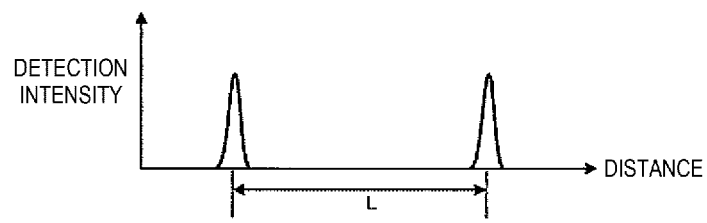

[FIG. 16]
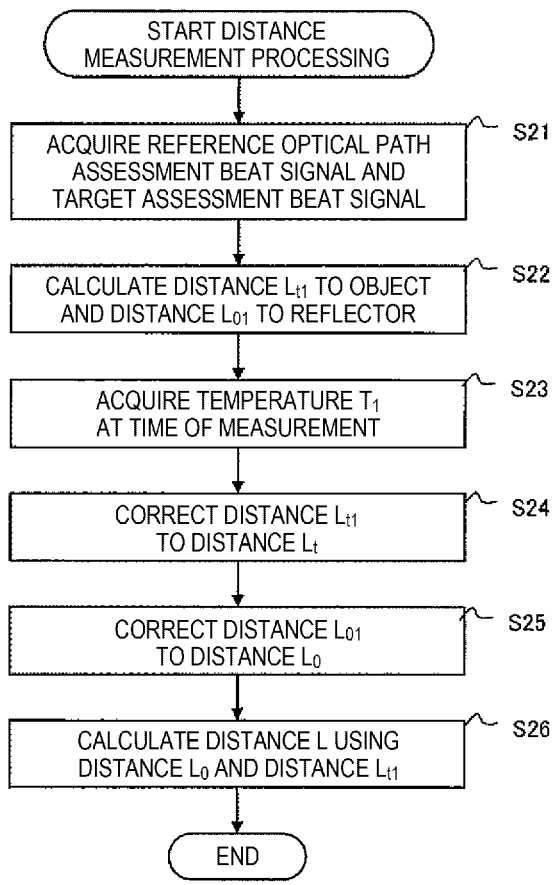

DISTANCE MEASUREMENT SYSTEM AND DISTANCE MEASUREMENT METHOD

TECHNICAL FIELD

The present invention relates to a distance measurement system and a distance measurement method. The invention claims priority of Japanese Patent Application number 2019-145889, filed on Aug. 8, 2019, regarding the designated countries that are permitted to be incorporated by reference in the literature, the content of that application will be incorporated into the present application by reference.

BACKGROUND ART

In a method of measuring a distance to an object in a non-contact manner using a light beam, it is known that, in a case where a reference optical path length serving as a distance reference is changed due to a change in the surrounding environment such as a temperature, it is not possible to accurately measure the distance.

As a countermeasure against this problem, for example, PTL 1 describes a method of using a temperature assessment unit, a heater or a cooler, a temperature controller, or the like to stabilize a temperature of an optical path that generates a clock signal serving as a distance reference.

CITATION LIST

Patent Literature

PTL 1: JP-A-2016-502428

SUMMARY OF INVENTION

Technical Problem

The method described in PTL 1 requires the temperature assessment unit, the heater or the cooler, the temperature controller, or like, and problems such as an increase in a size of a box that stores an optical fiber, which serves as a reference optical path, together with these members, a time required for the temperature to stabilize, and an increase in cost.

The invention has been made in view of such circumstances, and an object of the invention is to enable a measured distance to be corrected in accordance with a change in the surrounding environment.

Solution to Problem

The present application includes a plurality of units that solve at least a part of the above problems. An example of the units is as follows.

In order to solve the above problems, a distance measurement system according to an aspect of the invention includes: a first light-receiving unit configured to irradiate an object with one part of a split light beam as assessment light, and receive light reflected by the object to detect a target assessment beat signal; a second light-receiving unit configured to guide the other part of the split light beam as reference light to a reference optical path serving as a distance reference, and receive the reference light that has passed through the reference optical path to detect a reference optical path assessment beat signal; a distance measurement unit configured to measure a distance to the object on the basis of the target assessment beat signal and the reference optical path assessment beat signal; a temperature sensor configured to assess a temperature in the periphery of the reference optical path; and a correction unit configured to correct the measured distance on the basis of the assessed temperature.

Advantageous Effect

According to an aspect of the invention, it is possible to correct a measured distance in accordance with a change in the surrounding environment.

Problems, configurations, and effects other than those described above will become apparent from the following description of embodiments.

BRIEF DESCRIPTION OF DRAWINGS

FIG. 1 is a diagram showing a configuration example of a distance measurement system according to a first embodiment of the invention.

FIG. 2 is a diagram for illustrating a principle of a frequency modulated continuous wave (FMCW) method.

FIG. 3 is a diagram showing an example of a result of performing FFT on a target assessment beat signal in the first embodiment.

FIGS. 4A and 4B show a configuration example of a storage box, where FIG. 4A shows a top view, and FIG. 4B shows a cross-sectional view.

FIGS. 5A and 5B show an example of an external box that covers the storage box, where FIG. 5A shows a top view, and FIG. 5B shows a side view.

FIG. 6 is a diagram showing a configuration example of functional blocks included in a control device.

FIG. 7 is a diagram for illustrating an example of calibration of an optical path length of a reference optical system.

FIG. 8 is a flow chart illustrating an example of a distance measurement processing according to the first embodiment.

FIG. 9 is a flow chart illustrating a modification of the distance measurement processing according to the first embodiment.

FIG. 10 is a diagram showing an example of a shape measurement system adopting the distance measurement system.

FIG. 11 is a diagram showing an example of a scanning mechanism of an assessment probe in the shape measurement system.

FIG. 12 is a diagram showing a first modification of the storage box and peripheral configurations thereof.

FIG. 13 is a diagram showing a second modification of the storage box and peripheral configurations thereof.

FIG. 14 is a diagram showing a configuration example of a distance measurement system according to a second embodiment of the invention.

FIG. 15 is a diagram showing an example of a result of performing FFT on a target assessment beat signal in the second embodiment.

FIG. 16 is a flow chart illustrating an example of a distance measurement processing according to the second embodiment.

DESCRIPTION OF EMBODIMENTS

Hereinafter, a plurality of embodiments of the invention will be described with reference to drawings. In all the drawings for illustrating the embodiments, the same members are denoted by the same reference numerals in principle, and repetitive descriptions thereof will be omitted. Further, in the following embodiments, it is needless to say that the components (including element steps and the like) are not always indispensable unless otherwise stated or except a case where the components are apparently indispensable in principle. It is needless to say that expressions "formed of A", "made of A", "having A", and "including A" do not exclude elements other than A unless otherwise stated that A is the only element thereof. Similarly, in the following embodiments, shapes, positional relation, or the like of the components or the like include those substantially approximate or similar to the shapes or the like unless otherwise particularly specified or considered to be obviously excluded in principle.

<Configuration Example of Distance Measurement System 10 According to First Embodiment of Invention>

FIG. 1 shows a configuration example of a distance measurement system 10 according to a first embodiment of the invention.

The distance measurement system 10 adopts a frequency modulated continuous wave (FMCW) method or a swept-source optical coherence tomography (SS-OCT) system to irradiate an object with a light beam and measure the distance to the object in a non-contact manner on the basis of the reflected light. The FMCW method is mainly used for long-distance measurement using a light source having a long coherent distance, whereas the SS-OCT method is mainly used for fine structure assessment using a light source having a short coherent distance, but basic principles are common.

The distance measurement system 10 includes a distance measurement device 100, a control device 117, and a display device 118.

The distance measurement device 100 irradiates an object 113 with a laser beam under control of the control device 117, measures a distance $L_1$ to the object 113 on the basis of the reflected light, and outputs the distance $L_1$ to the control device 117.

The control device 117 acquires the distance $L_1$ to the object 113 from the distance measurement device 100 and a temperature $T_1$ inside a storage box 114 at a time of measurement, and corrects the distance $L_1$ to a distance L on the basis of the temperature $T_1$. Further, the control device 117 displays a 3D image of the object 113 on the display device 118 on the basis of the corrected distance L.

The distance measurement device 100 includes a laser beam source 101, an oscillator 102, an optical fiber coupler 103, a light receiver 107, a fiber circulator 108, a light receiver 109, an optical fiber coupler 110, a reference mirror 111, an optical fiber collimator 112, the storage box 114, and a distance measurement unit 116.

The storage box 114 stores an optical fiber coupler 104, a reference optical path optical fiber 105, an optical fiber coupler 106, and a temperature sensor 115.

The oscillator 102 modulates a driving current supplied to the laser beam source 101 on the basis of a sweep waveform signal input from the distance measurement unit 116. As a result, the laser beam source 101 generates frequency modulated (FM) light beam whose frequency is swept temporally at a constant modulation speed.

The laser beam source 101 may be configured with a semiconductor laser device including an external resonator, and a resonance wavelength of the laser beam source 101 may be changed by a triangular wave-shaped control signal from the oscillator 102. In this case, the FM light beam whose frequency is temporally swept is generated from the laser beam source 101.

Laser light generated by the laser beam source 101 is guided to the optical fiber coupler 103. The optical fiber coupler 103 splits the laser beam into two. One part of the split laser beam is guided to the fiber circulator 108, and the other part of the laser beam is guided to the storage box 114.

The fiber circulator 108 allows laser beam from the optical fiber coupler 103 to pass therethrough. The laser beam that has passed through the fiber circulator 108 is guided to the optical fiber coupler 110. The optical fiber coupler 110 splits the laser beam that has passed through the fiber circulator 108 into two. One part of the split laser beam is guided to the reference mirror 111, reflected by the reference mirror 111, and returns to the optical fiber coupler 110.

The other part of the laser beam split by the optical fiber coupler 110 is guided to the optical fiber collimator 112, and is emitted by the optical fiber collimator 112 toward the object 113 as assessment light. The assessment light reflected by the object 113 passes through the optical fiber collimator 112 and returns to the optical fiber coupler 110.

The optical fiber coupler 110 combines the light reflected by the reference mirror 111 and the light reflected by the object 113 to guide the combined light to the fiber circulator 108. The fiber circulator 108 guides the combined light to the light receiver 109. The light receiver 109 detects a target assessment beat signal generated by interference between the light reflected by the reference mirror 111 and the light reflected by the object 113, which are combined. The light receiver 109 corresponds to a first light-receiving unit of the invention.

The laser beam split by the optical fiber coupler 103 and guided to the storage box 114 is further split into two by the optical fiber coupler 104 in the storage box 114. One part of the split FM light beam is guided to the optical fiber coupler 106 after being provided with a constant optical path difference with respect to the other part of the laser beam by passing through the reference optical path optical fiber 105. The optical fiber coupler 106 combines the split light beam whose one part is provided with the optical path difference, and guides the combined light to the light receiver 107. The storage box 114 and the light receiver 107 function as a Mach-Zehnder interferometer, and the light receiver 107 detects a constant reference optical path assessment beat signal proportional to the optical path difference provided by the reference optical path optical fiber 105. The light receiver 107 corresponds to a second light-receiving unit of the invention.

The distance measurement unit 116 outputs a sweep waveform signal to the oscillator 102. The distance measurement unit 116 further monitors a temperature inside the storage box 114 by using the temperature sensor 115.

The distance measurement unit 116 acquires the reference optical path assessment beat signal from the light receiver 107 and the target assessment beat signal from the light receiver 109, and uses the reference optical path assessment beat signal as a sampling clock to perform A/D conversion on the target assessment beat signal.

Alternatively, the distance measurement unit 116 samples the reference optical path assessment beat signal and the target assessment beat signal at a constant sampling clock. More specifically, by performing a Hilbert transform on the reference optical path assessment beat signal, a signal whose phase is deviated by 90 degrees can be created, and a local phase of the signal can be determined from the reference optical path assessment beat signals before and after the Hilbert transform. Therefore, by interpolating the phase, a timing at which the reference optical path assessment beat signal has a constant phase can be obtained, and by interpolating and sampling the assessment beat signal in accordance with this timing, an assessment signal may be resampled with reference to a reference signal.

Alternatively, a similar result can also be obtained by the distance measurement unit 116 sampling the target assessment beat signal and performing A/D conversion on the target assessment beat signal by using a built-in AD/DA converter with the reference optical path assessment beat signal as the sampling clock.

The distance measurement unit 116 further calculates the distance $L_1$ to the object 113 on the basis of the target assessment beat signal after the A/D conversion.

The optical fiber couplers 103, 104, 106, and 110 in the distance measurement device 100 may be beam splitters.

<Method for Calculating Distance $L_1$ to Object 113 on the Basis of Target Assessment Beat Signal>

Next, a method for calculating the distance $L_1$ to the object 113 on the basis of the target assessment beat signal will be described with reference to FIGS. 2 and 3.

FIG. 2 is a diagram for illustrating a principle of the FMCW method.

As shown in this figure, a time difference $\Delta t$ is present between a timing at which a reference light 201 arrives at the light receiver 107 and a timing at which an assessment light 202 arrives at the light receiver 109. In this time difference $\Delta t$, a light frequency of the FM light beam from the laser beam source 101 changes, and thus the distance measurement unit 116 detects a target assessment beat signal having a beat frequency $f_b$ equal to a frequency difference due to the change in the light frequency. When a frequency sweep width is $\Delta v$ and time required to modulate by $\Delta v$ is T, the time difference $\Delta t$ is represented by the following Equation (1).

[Equation 1]
$$\Delta t = \frac{T}{2\Delta v} f_b \quad (1)$$

The distance $L_1$ to the object 113 is half of a distance by which light travels during the time difference $\Delta t$, and thus the distance $L_1$ can be calculated by the following Equation (2) using a light velocity c in the atmosphere.

[Equation 2]
$$L_1 = \frac{cT}{2\Delta v} f_b \quad (2)$$

It can be seen from Equation (2) that the distance $L_1$ and the beat frequency $f_b$ have a linear relation. Therefore, by performing a first Fourier transform (FFT) on the target assessment beat signal detected by the light receiver 109 and determining a peak position and a size thereof, a reflection position and a reflected light amount of the object 113 can be obtained.

Next, a method for determining the reflection position on a surface of the object 113 from a reflection intensity profile will be described with reference to FIG. 3. FIG. 3 shows a result of performing FFT on the target assessment beat signal, and in this figure, in which a horizontal axis represents a frequency of FFT, and a vertical axis represents a reflection intensity.

As shown in this figure, the vicinity of a peak of a detection waveform 301 is discrete data. Here, a peak width w is calculated by a distance resolution (c/2Δv). Assuming that the detection waveform is a quadratic function or a Gaussian function, by determining the peak using data of three or more points in the vicinity of the peak of the detection waveform 301 shown in this figure, a position of an assessment target can be determined with an accuracy equal to or higher than the distance resolution.

Although a method using FFT has been described as an example of an analysis of the beat frequency $f_b$, for example, a maximum entropy method may be used for the analysis of the beat frequency $f_b$. In the above case, the peak position can be detected with a higher resolution than that of the method using FFT.

<Influence of Surrounding Environment on Optical Path Length of Reference Optical System>

In the distance measurement device 100, the optical path length of the reference optical system is a reference of the distance $L_1$ to be measured, and thus needs to be determined accurately.

The optical path length of the reference optical system may be changed under an influence of a change in the surrounding environment, specifically, a temperature change, an atmospheric pressure change, a humidity change, or the like, for example. For example, when an optical fiber is adopted in an optical path of the reference optical system, the optical path length of the reference optical system is most affected by the temperature change.

Therefore, in the present embodiment, the optical fiber serving as the optical path of the reference optical system is stored in the storage box 114, the temperature sensor 115 is provided inside the storage box 114, and a measured distance is corrected assuming a change in the optical path length of the reference optical system in accordance with a temperature change inside the storage box 114.

In the present embodiment, the temperature inside the storage box 114 is monitored, whereas the humidity, the atmospheric pressure, and the like may be monitored in addition to the temperature.

Next, FIG. 4 shows a configuration example of the inside of the storage box 114, where (A) of this figure shows a top view of the storage box 114, and (B) of this figure shows a cross-sectional view of the storage box 114. In (A) of this figure, an upper surface of a lip 40 is omitted. In (B) of this figure, only a substrate 401, a fiber support unit 402, and a lid 403 forming the storage box 114 are shown, and other components are omitted.

In this configuration example, an optical fiber is adopted as the optical path of the reference optical system.

The storage box 114 is formed of the substrate 401 and the lid 403. The optical fiber coupler 104, the reference optical path optical fiber 105, the optical fiber coupler 106, and the temperature sensor 115 are arranged on the substrate 401, and are covered by the lid 403. The substrate 401 is formed of a material having high thermal conductivity and low thermal expansibility, such as copper or aluminum. The optical fiber couplers 104 and 106, the reference optical path optical fiber 105, and a plurality of temperature sensors 115 are fixed on the substrate 401 by using a seal or grease having high thermal conductivity.

The lid 403 is formed of the same material as that of the substrate 401 in a manner covering an upper surface and side surfaces of the substrate 401. The lid 403 is provided with holes that allow an optical fiber connected to the optical fiber coupler 104 from the optical fiber coupler 103 and an optical fiber connected to each light receiver 107 from the optical fiber coupler 106 to pass through, and is applied with a packing having high airtightness and heat insulation. As a result, the temperature inside the storage box 114 becomes uniform, and a temperature of the substrate 401 is easily transmitted to the reference optical path optical fiber 105. Therefore, temperatures of optical fibers can be regarded as uniform in view of the correction, which can contribute to a reduction of the number of the temperature sensors 115 and simplification of calculation processing.

The fiber support unit 402 using a material the same as that of the substrate 401 is formed on the substrate 401. The fiber support unit 402 is formed in a cylinder shape in the case of this figure, whereas the fiber support unit 402 may have any shape without being limited to the cylinder shape. The reference optical path optical fiber 105 is wound around the fiber support unit 402. An area occupied by the reference optical path optical fiber 105 in the storage box 114 can be reduced by winding the reference optical path optical fiber 105 around the fiber support unit 402.

When the reference optical path optical fiber 105 is wound around the fiber support unit 402, it is desirable that the reference light path optical fiber 105 is weakly wound with deflection such that no tension is applied to the reference light path optical fiber 105. As a result, for example, even if the fiber support unit 402 is deformed due to the temperature change inside the storage box 114, the influence of the deformation on the reference optical path optical fiber 105 can be prevented.

On the contrary, the reference optical path optical fiber 105 may be tightly wound around the fiber support unit 402 such that tension is applied to the reference optical path optical fiber 105. In this case, the reference optical path optical fiber 105 changes per se due to the temperature change and is also affected by the deformation of the fiber support unit 402 due to the temperature change, and a correction may be performed including these deformations.

The reference optical path optical fiber 105 may be a loose tube type in which the optical fiber is covered with a loose tube. If the reference optical path optical fiber 105 is the loose tube type, tension can be prevented from being applied to the reference optical path optical fiber 105 when the reference optical path optical fiber 105 is fixed on the substrate 401 or the like. The reference optical path optical fiber 105 may be either a single mode fiber or a polarization plane preservation fiber.

The temperature sensors 115 may adopt, for example, a thermocouple or a resistance temperature detector (RTD). The temperature sensors 115 may be of any type as long as the temperature can be assessed. In the case of this figure, the temperature sensors 115 are provided at three locations in the periphery of the reference optical path optical fiber 105. Accordingly, temperature distribution in the vicinity of the reference optical path optical fiber 105 can be monitored. The number of the temperature sensors 115 is not limited to 3, and may be 1, 2, or 4 or more.

The fiber support unit 402 may be omitted from the substrate 401, and the reference optical path optical fiber 105 may be stored in the storage box 114 without being wound around the fiber support unit 402.

Next, FIG. 5 shows a configuration example of an external box 501 that covers the entire storage box 114, where (A) of this figure is a top view of the external box 501, and (B) of this figure is a side view of the external box 501.

The external box 501 is formed of a material having high heat insulation such as acrylic and styrene foam. The external box 501 is provided with holes that allow the optical fiber connected to the optical fiber coupler 104 from the optical fiber coupler 103 and the optical fiber connected to each light receiver 107 from the optical fiber coupler 106 to pass through, and is applied with a packing having high airtightness and heat insulation. As a result, it is possible to prevent an influence of the external environment (temperature or the like) on the storage box 114 covered by the external box 501. The external box 501 may be made of any material having any thickness as long as the external box 501 has a higher heat insulation property than that of the storage box 114.

Next, FIG. 6 shows a configuration example of functional blocks included in the control device 117.

The control device 117 includes a general computer such as a personal computer including a central processing unit (CPU), a memory, a storage, a communication interface, and the like, and implements the functional blocks shown in this figure by the CPU executing a predetermined program.

The control device 117 includes functional blocks including a correction unit 601, an information management unit 602, and a display control unit 603. The correction unit 601 acquires the distance $L_1$ to the object 113, the temperature $T_1$ of the storage box 114, and a temperature $T_0$ at the time of calibration from the distance measurement unit 116, and corrects the distance $L_1$ to the distance L on the basis of the temperatures $T_0$ and $T_1$. The information management unit 602 manages an optical path length change rate α of the reference optical system (hereinafter, referred to as a reference optical path length change rate). Specifically, the reference optical path length change rate α, which is determined in advance, is stored in a memory or the like of a computer, then read out and output to the correction unit 601. The display control unit 603 causes the display device 118 to display various screens.

The reference optical path length change rate α can be determined on the basis of the material used for the reference optical path. For example, when the reference optical path optical fiber 105 is used as the reference optical path as shown in FIG. 4, physical property values of a refractive index change and a thermal expansion coefficient due to the temperature change of the reference optical path optical fiber 105 are used for the reference optical path length change rate α.

The reference optical path length change rate α may also be determined on the basis of an actual measurement value of change in the reference optical path length due to the temperature change. For example, the reference optical path length change rate α may be calculated from a change in the distance $L_1$ measured when a temperature of the reference optical path is changed.

The control device 117 may be integrated with the distance measurement unit 116. In that case, the distance measurement unit 116 may also serve as the control device 117, or conversely, the control device 117 may also serve as the distance measurement unit 116.

<Calibration of Optical Path Length of Reference Optical System>

Next, FIG. 7 shows an example of calibration of the optical path length of the reference optical system in the distance measurement device 100. The optical path length of the reference optical system is calibrated before the distance measurement device 100 is shipped.

The calibration is performed with a laser interferometer 701. The laser interferometer 701 cannot measure an absolute distance, but can measure a relative position with an accuracy in submicrometer order by continuously assessing displacement of the distance to the object while assessing the distance to the object, and thus can be used as a reference for distance measurement.

In the calibration, the laser interferometer 701 is arranged such that a laser beam emitted from the distance measurement device 100 and a laser beam emitted from the laser interferometer 701 are orthogonal to each other, and an optical element 702 such as a beam splitter is arranged at a position where the two laser beams are orthogonal to each other. The laser interferometer 701 and the optical element 702 are adjusted such that the laser beam from the distance measurement device 100 and the laser beam from the laser interferometer 701 travel in the same optical path to irradiate a mirror 703 as an object. If a wavelength of the laser beam from the distance measurement device 100 and a wavelength of the laser beam from the laser interferometer 701 are different, a dichroic mirror can be used for the optical element 702.

The mirror 703 is mounted on a mirror movement unit 704 and can move on the mirror movement unit 704 in a direction parallel to the laser beam. Therefore, when the mirror 703 moves continuously, the distance measurement device 100 can measure a changing distance to the mirror 703. At this time, the temperature $T_0$ of the reference optical path is also recorded.

On the other hand, the laser interferometer 701 can measure a movement amount of the mirror 703 with high accuracy. The reference optical path length in the distance measurement device 100 is calibrated on the basis of a measurement result by the distance measurement device 100 and a measurement result by the laser interferometer 701. The calibrated reference optical path length and the temperature $T_0$ at the time of calibration are stored in the distance measurement unit 116. The temperature $T_0$ at the time of the calibration may be stored in the control device 117.

<Distance Measurement Processing by Distance Measurement System 10>

Next, FIG. 8 is a flow chart illustrating an example of a distance measurement processing by the distance measurement system 10.

First, in the distance measurement device 100, the distance measurement unit 116 acquires the target assessment beat signal detected by the light receiver 109 and the reference optical path assessment beat signal detected by the light receiver 107 (step S1). Next, the distance measurement unit 116 performs the A/D conversion on the target assessment beat signal using the reference optical path assessment beat signal as the sampling clock, and calculates the distance $L_1$ to the object 113 on the basis of the target assessment beat signal after the A/D conversion with the calibrated reference optical path length serving as the reference (step S2).

Next, the correction unit 601 of the control device 117 acquires the distance $L_1$, the temperature $T_0$ at the time of the calibration, and the temperature $T_1$ of the storage box 114 from the distance measurement unit 116 (step S3).

Next, the correction unit 601 acquires the reference optical path length change rate α from the information management unit 602, and corrects the distance $L_1$ to the distance L in accordance with the following Equation (3) (step S4).

[Equation 3]

$$L=L_1(1+\alpha(T_1-T_0)) \quad (3)$$

According to the distance measurement processing described above, the distance $L_1$ to the object 113 can be corrected to the distance L in accordance with the change in the reference optical path length due to the change in the surrounding environment, specifically, the temperature.

Next, FIG. 9 is a flow chart illustrating a modification of the distance measurement processing by the distance measurement system 10. In the modification, the distance L is calculated without calculating the distance $L_1$. As a premise of the modification, it is assumed that the information management unit 602 acquires and manages the calibrated reference optical path length and the temperature $T_0$.

First, in the distance measurement device 100, the distance measurement unit 116 acquires the target assessment beat signal detected by the light receiver 109 and the reference optical path assessment beat signal detected by the light receiver 107, and performs the A/D conversion on the target assessment beat signal using the reference optical path assessment beat signal as the sampling clock (step S11).

Next, the correction unit 601 of the control device 117 acquires the target assessment beat signal after the A/D conversion and the temperature $T_1$ of the storage box 114 from the distance measurement unit 116 (step S12).

Next, the correction unit 601 acquires the calibrated reference optical path length, the temperature $T_0$, and the reference optical path length change rate α from the information management unit 602, and calculates the distance L on the basis of the same (step S13).

According to the modification of the distance measurement processing described above, it is possible to obtain the distance L to the object 113 in consideration of the change in the reference optical path length due to the change in the surrounding environment, specifically, the temperature, with a smaller amount of calculation.

<Shape Measurement System 900 Adopting Distance Measurement System 10>

Next, FIG. 10 shows an example of a shape measurement system 900 adopting the distance measurement system 10.

The shape measurement system 900 includes the distance measurement system 10, a connection cable 901, and an assessment probe 902. In the shape measurement system 900, the distance measurement device 100 is connected to the assessment probe 902 via the connection cable 901 such as an optical cable.

The assessment probe 902 includes an optical fiber collimator 903, a rotation mechanism unit 904, and a probe tip unit 906.

The optical fiber collimator 903 emits the assessment light guided by the connection cable 901 from the distance measurement device 100 into a space. The rotation mechanism unit 904 rotationally drives the probe tip unit 906 while holding the probe tip unit 906. The probe tip unit 906 holds therein an optical path switching element 905 as a beam scanning mechanism, and rotates the optical path switching element 905 by being rotationally driven by the rotation mechanism unit 904. The optical path switching element 905 transmits the assessment light emitted from the optical fiber collimator 903 and causes the assessment light to travel straight or deflects the assessment light in a lateral direction.

In the shape measurement system 900, the assessment light from the distance measurement device 100 is guided to the optical fiber collimator 903 of the assessment probe 902 by the connection cable 901, and is emitted to the space by the optical fiber collimator 903.

The emitted assessment light travels straight or is deflected by the optical path switching element 905, so as to irradiate the object 113. At this time, by the probe tip unit 906 being rotationally driven by the rotation mechanism unit 904, the assessment light is irradiated to a side surface of the object 113 into which the probe tip unit 906 is inserted, and therefore, a distance to the side surfaces of the object 113 can be measured.

A shape of the object 113 is calculated by the control device 117 on the basis of the measured distance to the side surface of the object 113 and information of a rotation angle of the rotation mechanism unit 904.

A configuration of the assessment probe 902 shown in this figure is an example, and a Galvano mirror may be used as the beam scanning mechanism. When one galvanometer mirror is used, the assessment light can be scanned in a one-dimensional manner, and when two galvanometer mirrors are used, the assessment light can be scanned in a two-dimensional manner. As the beam scanning mechanism, a micro electro mechanical systems (MEMS) mirror, a polygon mirror, or the like may be adopted.

Next, FIG. 11 shows an example of a scanning mechanism that scans the assessment probe 902. In the example of this figure, the object 113 is fixed on a stage 1004, and the assessment probe 902 is moved around the object 113 by a gantry type (gate type) scanning mechanism.

In the gate type scanning mechanism, an X-axis movement mechanism 1002 that moves in an X-axis direction is mounted on a Y-axis movement mechanism 1001 that moves in a Y-axis direction, and a Z-axis movement mechanism 1003 that moves in a Z-axis direction is further mounted on the X-axis movement mechanism 1002. The assessment probe 902 is connected to the Z-axis movement mechanism 1003. Movement of the Y-axis movement mechanism 1001, the X-axis movement mechanism 1002, and the Z-axis movement mechanism 1003 is controlled by the control device 117. Therefore, by moving the Y-axis movement mechanism 1001, the X-axis movement mechanism 1002, and the Z-axis movement mechanism 1003, the assessment probe 902 can be moved three-dimensionally, and a non-contact shape assessment having high performance can be realized.

The distance measurement device 100 is provided at a side surface of the assessment probe 902 in the case of this figure, whereas the distance measurement device 100 may be at any position. For example, the distance measurement device 100 may be arranged side by side with the control device 117, or may be arranged inside the assessment probe 902.

Incidentally, for example, in a three-axis processing machine, the Z-axis is often provided at a tool side, and the X-axis and the Y-axis are often provided on the object side. On-machine assessment on processing machine can be realized by grasping the assessment probe 902 instead of the tool in the three-axis processing machine.

Furthermore, a three-dimensional shape assessment device can be realized by, for example, holding and moving the assessment probe 902 by a multi-degree-of-freedom robot and assessing the shape of the object 113.

When an assessment target range is narrow and the shape of the object 113 can be measured by moving the object 113 alone in the Z-axis direction, the assessment may be performed by positioning the object 113 with a jig such that the position of the object 113 is uniquely determined, and moving the Z-axis movement mechanism 1003 alone.

Furthermore, in the example of this figure, the assessment probe 902 is moved in the periphery of the fixed object 113, and conversely, the object 113 may be moved around a fixed assessment probe 902. That is, the invention can be applied to all shape measurement systems in which at least one of the assessment probe 902 and the object 113 is moved to change the relative positional relation between the object 113 and the assessment probe 902.

<Modification of Storage Box 114 and Peripheral Configurations Thereof>

Next, FIG. 12 shows a first modification of the storage box 114 in the distance measurement device 100 (FIG. 1) and peripheral configurations thereof. Elements of the first modification common to the configuration example shown in FIG. 1 are designated by the same reference numerals and the description thereof will be omitted.

In the first modification, a fiber circulator 1101 is provided between the optical fiber coupler 103 and the storage box 114. The fiber circulator 1101 allows the other part of the laser beam split by the optical fiber coupler 103 to pass therethrough and guides the same to an optical fiber coupler 1102 of the storage box 114. The fiber circulator 1101 guides the laser beam from the storage box 114 to the light receiver 107.

The reference optical path optical fiber 105, the temperature sensor 115, the optical fiber coupler 1102, and mirrors 1103 and 1104 are stored in the storage box 114 of the first modification.

The optical fiber coupler 1102 splits the laser beam that has passed through the fiber circulator 1101 into two. One part of the laser beam split by the optical fiber coupler 1102 is guided to and reflected by the mirror 1103, and returned to the optical fiber coupler 1102. The other part of the laser beam split by the optical fiber coupler 1102 is delayed by the reference optical path optical fiber 105, guided to and reflected by the mirror 1104, and returned to the optical fiber coupler 1102. The optical fiber coupler 1102 combines light reflected by the mirrors 1103 and 1104, respectively, and guides the combined light to the fiber circulator 1101.

In the case of the first modification, the other part of the light beam split by the optical fiber coupler 1102 reciprocates in the reference optical path optical fiber 105, and thus a length of the reference optical path optical fiber 105 can be halved to provide an optical path length the same as that of the configuration example of FIG. 1.

Next, FIG. 13 shows a second modification of the storage box 114 in the distance measurement device 100 (FIG. 1) and peripheral configurations thereof. Elements of the second modification common to the configuration example shown in FIG. are designated by the same reference numerals and the description thereof will be omitted.

Similar to the first modification, in the second modification, the fiber circulator 1101 is provided between the optical fiber coupler 103 and the storage box 114. The fiber circulator 1101 allows the other part of the laser beam split by the optical fiber coupler 103 to pass therethrough and guides the same to an optical fiber collimator 1201 of the storage box 114. The fiber circulator 1101 guides the laser beam from the storage box 114 to the light receiver 107.

The storage box 114 in the second modification stores the plurality of temperature sensors 115, the optical fiber collimator 1201, an optical element 1202, and a mirror 1203.

The optical fiber collimator 1201 emits the laser beam that has passed through the fiber circulator 1101 toward the mirror 1203 and emits the same into the space (in the air) inside the storage box 114. The optical element 1202 is arranged between the optical fiber collimator 1201 and the mirror 1203, allows a part of the incident laser beam to pass through, and reflects the rest of the incident laser beam. In the case of the second modification, an optical path difference between the light reflected by the mirror 1203 and the light reflected by the optical element 1202 is the reference optical path length.

In the second modification, the light that is emitted from the optical fiber collimator 1201 and has passed through the optical element 1202 is reflected by the mirror 1203, passes through the optical element 1202 again, collected by the optical fiber collimator 1201, and guided to the fiber circulator 1101. On the other hand, the light emitted from the optical fiber collimator 1201 and reflected by the optical element 1202 is also collected by the optical fiber collimator 1201, and guided to the fiber circulator 1101. The fiber circulator 1101 guides the light returned from the optical fiber collimator 1201 to the light receiver 107.

Air exists between the optical element 1202 and the mirror 1203 in the case of the second modification, whereas a glass rod or the like having a refractive index higher than that of air may be arranged between the optical element 1202 and the mirror 1203 to make the reference optical path length longer as a modification.

<Configuration Example of Distance Measurement System 20 According to Second Embodiment of Invention>

In the distance measurement system 10 (FIG. 1) described above, an origin of the distance to be measured, that is, a point where the target assessment beat signal obtained by the FMCW method becomes zero, is set to a point at a distance equal to the distance from the optical fiber coupler 110 to the reference mirror 111 in an optical path in which the laser beam is guided to the optical fiber collimator 112 after being split by the optical fiber coupler 110.

The position of the origin of this distance changes when the length of each optical fiber after being split by the optical fiber coupler 110 changes due to the temperature change inside the distance measurement device 100, and thus a distance measurement error may occur. In order to prevent the occurrence of such distance measurement error, a reflector that transmits most of the assessment light and reflects the rest of the assessment light may be fixedly arranged on an optical path from the optical fiber collimator 112 to the object 113, for example, on a housing of the distance measurement device 100. In this case, a distance to the fixed reflector and the distance to the object 113 can be assessed, and by setting a position of the reflector as the origin of the distance, an error of the distance to the object 113 can be reduced.

Next, FIG. 14 shows a configuration example of a distance measurement system 20 according to the second embodiment of the invention.

The distance measurement system 20 is obtained by adding a reflector 1301 on the optical path from the optical fiber collimator 112 to the object 113 with respect to the distance measurement system 10 (FIG. 1) according to the first embodiment of the invention. The reflector 1301 transmits most of the assessment light emitted from the optical fiber collimator 112, and reflects the rest of the assessment light to the optical fiber collimator 112.

Elements other than the reflector 1301 of the distance measurement system 20 are common with elements of the distance measurement system 10 and designated by the same reference numerals, and the description thereof will be omitted.

In the distance measurement system 20, most of the assessment light emitted from the optical fiber collimator 112 transmits the reflector 1301 to irradiate the object 113, then reflected by the object 113 and transmits the reflector 1301, and is collected by the optical fiber collimator 112. On the other hand, the assessment light emitted from the optical fiber collimator 112 and reflected by the reflector 1301 is also collected by the optical fiber collimator 112. Therefore, the target assessment beat signal detected by the light receiver 109 of the distance measurement system 20 is a mixture of a component representing the distance to the reflector 1301 and a component representing the distance to the object 113.

FIG. 15 shows an example of a result of performing FFT on the target assessment beat signal detected by the light receiver 109 of the distance measurement system 20. In this figure, a horizontal axis represents a frequency axis of FFT, and a vertical axis represents a reflection intensity.

As shown in this figure, in the case of the distance measurement system 20, since the distance to the reflector 1301 and the distance to the object 113 are different, peaks of the reflection intensity representing respective distances appear at two places. Accordingly, if the reflector 1301 is set as the distance origin, the distance L to the object 113 may be determined with high accuracy.

<Distance Measurement Processing by Distance Measurement System 20>

Next, FIG. 16 is a flow chart illustrating an example of a distance measurement processing by the distance measurement system 20.

First, in the distance measurement device 100, the distance measurement unit 116 acquires the target assessment beat signal detected by the light receiver 109 and the reference optical path assessment beat signal detected by the light receiver 107 (step S21). Next, the distance measurement unit 116 performs the A/D conversion on the target assessment beat signal using the reference optical path assessment beat signal as the sampling clock, and calculates a distance $L_{t1}$ to the object 113 and a distance $L_{O1}$ to the reflector 1301 on the basis of the target assessment beat signal after the A/D conversion with the calibrated reference optical path length serving as the reference (step S22).

Next, the correction unit 601 of the control device 117 acquires the distance $L_{t1}$, the distance $L_{O1}$, the temperature $T_0$ at the time of the calibration, and the temperature $T_1$ of the storage box 114 from the distance measurement unit 116 (step S23).

Next, the correction unit 601 acquires the reference optical path length change rate $\alpha$ from the information management unit 602, and corrects the distance $L_{t1}$ to the distance $L_t$ in accordance with the following Equation (4) (step S24).

[Equation 4]

$$L_t = L_{t1}(1+\alpha(T_1-T_0)) \quad (4)$$

Next, the correction unit 601 corrects the distance $L_{O1}$ to the distance $L_O$ in accordance with the following Equation (5) (step S25).

[Equation 5]

$$L_O = L_{O1}(1+\alpha(T_1-T_0)) \quad (5)$$

Next, the correction unit 601 calculates the distance L by subtracting the distance $L_O$ from the distance $L_t$ as shown in the following Equation (6) (step S26).

According to the distance measurement processing described above, it is possible to obtain the distance L to the object 113 with the position of the reflector 1301 as the origin, which is corrected in accordance with the change in the reference optical path length due to the change in the surrounding environment, specifically, the temperature.

The calculated distance L has the fixed reflector 1301 as the origin, and thus a measurement error due to the temperature change inside the distance measurement device 100 is reduced as compared with the distance L calculated by the distance measurement system 10 (FIG. 1).

The invention is not limited to the above embodiments, but includes various modifications. Further, each of the embodiments described above has been described in detail for easy understanding of the invention, and the invention is not necessarily limited to the one including all the components described above. In addition, a part of the configurations of one embodiment can be replaced with the configurations of another embodiment, and the configurations of another embodiment can also be added to the configurations of one embodiment. In addition, a part of the configurations of each embodiment could be added, deleted, or replaced with other configurations.

A part or all of the above configurations, functions, processing units, processing sections, etc., may be implemented by a hardware, for example, by designing an integrated circuit. The above configurations, functions, and the like may also be implemented by software by means of interpreting and executing a program, by a processor, for implementing respective functions. Information such as a program, a table, and a file for implementing each of the functions can be stored in a recording device such as a memory, a hard disk, or a solid state drive (SSD), or in a recording medium such as an IC card, an SD card, or a DVD.

Control lines or information lines indicate what is considered necessary for description, and not all the control lines or information lines are necessarily shown in a product. In practice, it may be considered that almost all configurations are connected to each other.

REFERENCE SIGN LIST 10, 20 distance measurement system
100 distance measurement device
101 laser beam source
102 oscillator
103 optical fiber coupler
104 optical fiber coupler
105 reference optical path optical fiber
106 optical fiber coupler
107 light receiver
108 fiber circulator
109 light receiver
110 optical fiber coupler
111 reference mirror
112 optical fiber collimator
113 object
114 storage box
115 temperature sensor
116 distance measurement unit
117 control device
118 display device
401 substrate
402 fiber support unit
403 lid
501 external box
601 correction unit
602 information management unit
603 display control unit
701 laser interferometer
702 optical element
703 mirror
704 mirror movement unit
900 shape measurement system
901 connection cable
902 assessment probe
903 optical fiber collimator
904 rotation mechanism unit
905 optical path switching element
906 probe tip unit
1001 Y-axis movement mechanism
1002 X-axis movement mechanism
1003 Z-axis movement mechanism
1004 stage
1101 fiber circulator
1102 optical fiber coupler
1103 mirror
1104 mirror
1201 optical fiber collimator
1202 optical element
1203 mirror
1301 reflector

The invention claimed is:

1. A distance measurement system, comprising:
a first light-receiving unit configured to irradiate an object with one part of a split light beam as assessment light, and receive light reflected by the object to detect a target assessment beat signal;
a second light-receiving unit configured to guide the other part of the split light beam as reference light to a reference optical path serving as a distance reference, and receive the reference light that has passed through the reference optical path to detect a reference optical path assessment beat signal;
a distance measurement unit configured to measure a distance to the object on the basis of the target assessment beat signal and the reference optical path assessment beat signal, including performing an A/D conversion on the target assessment beat signal by using a built-in A/D converter with the reference optical path assessment beat signal as a sampling clock and calculating the distance to the object based on the target assessment beat signal after the A/D conversion;
a storage box configured to store the reference optical path;
a temperature sensor configured to assess a temperature inside the storage box as a temperature in the periphery of the reference optical path;
a correction unit configured to correct the measured distance on the basis of the assessed temperature; and
an optical fiber serving as the reference optical path that is wound with deflection around a fiber support unit formed inside the storage box such that even if the fiber support unit is deformed due to a temperature change inside the storage box, an influence of deformation on the optical fiber serving as the reference optical path is prevented.

2. The distance measurement system according to claim 1, wherein
the distance measurement unit is configured to measure the distance to the object by an FMCW method or an SS-OCT method.

3. The distance measurement system according to claim 1, wherein
the storage box is formed of copper or aluminum.

4. The distance measurement system according to claim 1, wherein
the temperature sensor uses a thermocouple or an RTD.

5. The distance measurement system according to claim 1, wherein
the distance measurement unit is configured to measure the distance to the object on the basis of a calibrated reference optical path length.

6. The distance measurement system according to claim 1, further comprising:

a reflector that is arranged and fixed between the object and an optical fiber collimator configured to irradiate the object with the assessment light, wherein the distance measurement unit is configured to measure the distance to the object with a position of the reflector as an origin.

7. The distance measurement system according to claim 1, wherein the temperature sensor is one of a plurality of temperature sensors that are arranged equidistantly around a periphery of the fiber support unit.

8. The distance measurement system according to claim 1, further comprising:

an external box that covers the storage box, has a higher heat insulation than the storage box, is formed of a material including acrylic or styrene foam, includes holes configured to allow the optical fiber to pass through, and includes a packing that provides airtightness and heat insulation around the storage box.

9. A distance measurement method using a distance measurement system, comprising:

a detection step of irradiating an object with one part of a split light beam as assessment light, and receiving light reflected by the object to detect a target assessment beat signal, while guiding the other part of the split light beam as reference light to a reference optical path serving as a distance reference, and receiving the reference light that has passed through the reference optical path to detect a reference optical path assessment beat signal;

a distance measurement step of measuring a distance to the object on the basis of the target assessment beat signal and the reference optical path assessment beat signal, including performing an A/D conversion on the target assessment beat signal by using a built-in A/D converter with the reference optical path assessment beat signal as a sampling clock and calculating the distance to the object based on the target assessment beat signal after the A/D conversion;

a temperature assessment step of assessing a temperature inside a storage box wherein the reference optical path is stored as a temperature in the periphery of the reference optical path; and a correction step of correcting the measured distance on the basis of the assessed temperature, wherein an optical fiber serving as the reference optical path is wound with deflection around a fiber support unit formed inside the storage box such that even if the fiber support unit is deformed due to a temperature change inside the storage box, an influence of deformation on the optical fiber serving as the reference optical path is prevented.

10. A distance measurement system, comprising:

a first light-receiving unit configured to irradiate an object with one part of a split light beam as assessment light, and receive light reflected by the object to detect a target assessment beat signal;

a second light-receiving unit configured to guide the other part of the split light beam as reference light to a reference optical path serving as a distance reference, and receive the reference light that has passed through the reference optical path to detect a reference optical path assessment beat signal;

a storage box configured to store the reference optical path;

a temperature sensor configured to assess a temperature inside the storage box as a temperature in the periphery of the reference optical path;

an information management unit configured to store a calibrated reference optical path length, a temperature at a time of calibration, and a reference optical path length change rate;

a correction unit configured to calculate a distance to the object on the basis of the target assessment beat signal, the reference optical path assessment beat signal, the calibrated reference optical path length, the temperature at the time of calibration, and the assessed temperature, including performing an A/D conversion on the target assessment beat signal by using a built-in A/D converter with the reference optical path assessment beat signal as a sampling clock and calculating the distance to the object based on the target assessment beat signal after the A/D conversion; and an optical fiber serving as the reference optical path that is wound with deflection around a fiber support unit formed inside the storage box such that even if the fiber support unit is deformed due to a temperature change inside the storage box, an influence of deformation on the optical fiber serving as the reference optical path is prevented.

* * * * *